(12) United States Patent
He et al.

(10) Patent No.: US 9,060,313 B2
(45) Date of Patent: Jun. 16, 2015

(54) ACKNOWLEDGEMENT SIGNALING IN A WIRELESS COMMUNICATIONS NETWORK

(71) Applicant: Intel Corporation, Santa Clara, CA (US)

(72) Inventors: Hong He, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 13/630,008

(22) Filed: Sep. 28, 2012

(65) Prior Publication Data

US 2013/0188569 A1 Jul. 25, 2013

Related U.S. Application Data

(60) Provisional application No. 61/589,774, filed on Jan. 23, 2012.

(51) Int. Cl.
*H04W 28/16* (2009.01)
*H04W 36/00* (2009.01)
(Continued)

(52) U.S. Cl.
CPC .......... *H04W 36/0066* (2013.01); *H04W 28/16* (2013.01); *H04W 48/16* (2013.01); *H04W 36/0061* (2013.01); *H04W 88/10* (2013.01); *H04B 17/318* (2015.01); *H04B 17/382* (2015.01)

(58) Field of Classification Search
CPC ...................................................... H04W 72/04
USPC ................................................ 370/329, 330
See application file for complete search history.

(56) References Cited

U.S. PATENT DOCUMENTS

| 2009/0245187 | A1* | 10/2009 | Nam et al. ..................... 370/329 |
| 2010/0309808 | A1* | 12/2010 | Miki et al. ..................... 370/252 |
| 2011/0075624 | A1* | 3/2011 | Papasakellariou et al. ... 370/329 |

(Continued)

FOREIGN PATENT DOCUMENTS

WO WO-2013112292 A1 8/2013

OTHER PUBLICATIONS

"Considerations on E-PDCCH Multiplexing with PDSCH", 3GPP TSG RAN WG1 Meeting #67. R1-113933. InterDigital Communications, LLC., (Nov. 14, 2011), 3 pgs.

(Continued)

*Primary Examiner* — Chirag Shah
*Assistant Examiner* — Jael Ulysse
(74) *Attorney, Agent, or Firm* — Schwegman Lundberg & Woessner, P.A.

(57) ABSTRACT

An apparatus and method to facilitate provision of acknowledgement signals in a wireless communications network are disclosed herein. An evolved node B (eNodeB) transmits radio resource control (RRC) signals indicating inclusion of an enhanced physical hybrid automatic repeat request (ARQ) indicator channel (e-PHICH) in a radio frame. The eNodeB configures the radio frame including the e-PHICH. At least one subframe of the radio frame includes a first resource block (RB) associated with a first UE, a second RB associated with a second UE, and a third RB. The first RB includes a physical downlink control channel (PDCCH) control region in a Slot 0 of the subframe and a first enhanced PDCCH (e-PDCCH) allocation in the Slot 0 and in a Slot 1 of the subframe. The e-PHICH allocation is included in the third RB or at least the Slot 1 of the subframe of the first RB.

20 Claims, 14 Drawing Sheets

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(51) Int. Cl.
*H04W 88/10* (2009.01)
*H04W 48/16* (2009.01)

(56) References Cited

U.S. PATENT DOCUMENTS

| | | | |
|---|---|---|---|
| 2013/0039299 A1* | 2/2013 | Papasakellariou et al. | 370/329 |
| 2013/0064196 A1* | 3/2013 | Gao et al. | 370/329 |
| 2013/0064216 A1* | 3/2013 | Gao et al. | 370/330 |
| 2013/0083750 A1* | 4/2013 | Nazar et al. | 370/329 |
| 2013/0201926 A1* | 8/2013 | Nam et al. | 370/329 |

OTHER PUBLICATIONS

"DCI and Functionalities of DL Enhanced Control Channels", 3GPP TSG RAN WG1 #67. R1-114243. Samsung., (Nov. 14, 2011), 3 pgs.
"Evolved Universal Terrestrial Radio Access (E-UTRA); Physical channels and modulation", ETSI TS 136 211 V10.5.0. 3GPP TS 36.211 version 10.5.0 Release 10. LTE., (Jul. 2012), 103 pgs.
"Evolved Universal Terrestrial Radio Access (E-UTRA); Physical channels and modulation", ETSI TS 136 211 V9.1.0. 3GPP TS 36.211 version 9.1.0 Release 9. LTE., (Apr. 2010), 87 pgs.
"Evolved Universal Terrestrial Radio Access (E-UTRA); Physical layer procedures", ETSI TS 136 213 V10.5.0. 3GPP TS 36.213 version 10.5.0 Release 10. LTE., (Mar. 2012), 127 pgs.
"International Application Serial No. PCT/US2013/020977, International Search Report mailed Apr. 26, 2013", 3 pgs.
"International Application Serial No. PCT/US2013/020977, Written Opinion mailed Apr. 26, 2013", 5 pgs.
"PDCCH Extension for ICIC and Capacity Gains", 3GPP TSG RAN WG1 #60bis. R1-102224. Samsung., (Apr. 12, 2010), 2 pgs.
"Resource multiplexing of E-PDCCH", 3GPP TSG RAN WG1 #67. R1-114241. Samsung., (Nov. 14, 2011), 3 pgs.
"International Application Serial No. PCT/US2013/020977, International Preliminary Report on Patentability mailed Aug. 7, 2014", 7 pgs.

* cited by examiner

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1

ACKNOWLEDGEMENT SIGNALING IN A WIRELESS COMMUNICATIONS NETWORK

CROSS-REFERENCE TO RELATED APPLICATIONS

This application claims priority to U.S. Provisional Patent Application No. 61/589,774 entitled "Advanced Wireless Communication Systems and Techniques" filed on Jan. 23, 2012, the content of which is incorporated herein by reference in its entirety.

TECHNICAL FIELD

The present disclosure relates generally to wireless communications. More particularly, the present disclosure relates to acknowledgement signaling within wireless communication systems.

BACKGROUND

In the current 3rd Generation Partnership Project (3GPP) long term evolution (LTE) time division duplex (TDD)-Advanced systems, the same frequency bands are used for the uplink and downlink transmissions between evolved node Bs (eNodeBs) and user equipment (UE). Uplink and downlink transmissions are separated by transmitting either uplink data or downlink data at each pre-determined block of time, known as subframes, on the same frequency bands. In TDD deployment, the uplink and downlink transmissions are structured into radio frames, each 10 ms in time length. Each radio frame may comprise a single frame or two half-frames of each 5 ms in time length. Each half-frame, in turn, may comprise five subframes of 1 ms time length each. Particular designations of subframes within a radio frame for uplink or downlink transmission—referred to as uplink and downlink configurations—can be defined. The seven supported uplink and downlink configurations (also referred to UL/DL configurations, uplink-downlink configurations, or uplink-downlink ratio configurations) are shown in a table 100 of FIG. 1, in which "D" denotes a subframe reserved for downlink transmission, "U" denotes a subframe reserved for uplink transmission, and "S" denotes a special subframe which includes the downlink pilot time slot (DwPTS), guard period (GP) and uplink pilot time slot (UpPTS) fields. (See 3GPP TS 36.211 Version 10.5.0, E-UTRA Physical Channels and Modulation (Release 10), June 2012.)

LTE environments are moving toward heterogeneous deployment and/or inter-band aggregation of component carriers (CCs) with different TDD UL/DL configurations to improve communication capacity. However, under the current supported UL/DL configurations, only Subframes 3 and 8 of each radio frame are allocated for DL hybrid automatic repeat request-acknowledge (HARQ-ACK) feedback on the physical hybrid automatic repeat request (ARQ) indicator channel (PHICH) channel by the UEs. Such PHICH resources are insufficient to address the increased DL HARQ-ACK feedback requirements associated with heterogeneous deployment and/or inter-band aggregation of CCs with different TDD UL/DL configurations.

BRIEF DESCRIPTION OF THE DRAWINGS

FIG. 1 illustrates supported uplink-downlink ratio configurations under the current 3GPP LTE TDD-Advanced standard.

DETAILED DESCRIPTION

The following description is presented to enable any person skilled in the art to create and use a computer system configuration and related method and article of manufacture to increase hybrid automatic repeat request (ARQ) indicator channel (PHICH) capacity by providing additional or enhanced PHICH (e-PHICH) resources multiplexed with existing physical signals. High-layer signaling (e.g., radio resource control (RRC) signaling) is used to inform and configure the user equipment (UEs) to detect the e-PHICH resources. In one embodiment the e-PHICH resources are allocated on different resource blocks (RBs) from UE-specific allocations of enhanced physical downlink control channel (e-PDCCH) resources. In another embodiment, the e-PHICH resources are co-located in one of the RB candidates allocated for UE-specific e-PDCCH transmission. Various embodiments for selecting and configuring the e-PHICH pattern design are also discussed herein.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

The enhanced hybrid automatic repeat request (ARQ) indicator channel (PHICH) signaling scheme described herein is applicable to homogeneous and/or heterogeneous wireless communications network deployments. Example homogeneous and heterogeneous network deployments are illustrated respectively in FIGS. 2 and 3.

Figure 2:
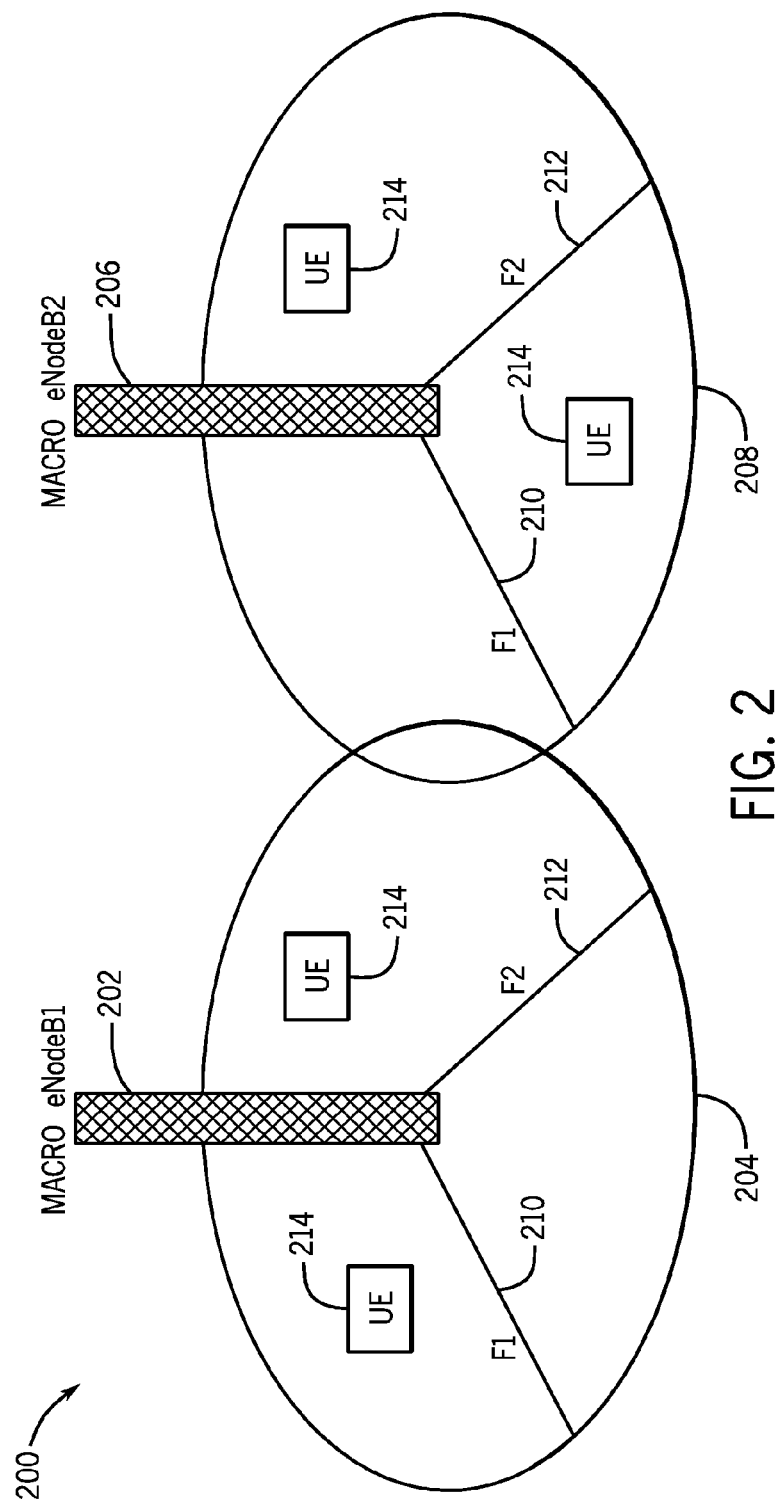
FIG. 2 illustrates an example (portion) of a wireless communications network shown in a homogenous network deployment according to some embodiments.

FIG. 2 illustrates an example (portion) of a wireless communications network 200 shown in a homogeneous network deployment according to some embodiments. In one embodiment, the wireless communications network 200 comprises an evolved universal terrestrial radio access network (EUTRAN) using the 3rd Generation Partnership Project (3GPP) long term evolution (LTE) standard and operating in time division duplexing (TDD) mode. The wireless communications network 200 includes a first macro evolved Node B (eNodeB or eNB) 202 and a second macro eNodeB 206.

The first macro eNodeB 202 (also referred to as eNodeB 1, a first base station, or a first macro base station) serves a certain geographic area, denoted as a first (macro) cell 204. A plurality of UEs 214 located within the first cell 204 are served by the first macro eNodeB 202. The first macro eNodeB 202 communicates with the UEs 214 on a first carrier frequency 210 (F1) and optionally, one or more secondary carrier frequencies, such as a second carrier frequency 212 (F2).

The second macro eNodeB 206 is similar to the first macro eNodeB 202 except it serves a different cell from that of the first macro eNodeB 202. The second macro eNodeB 206 (also referred to as eNodeB2, a second base station, or a second macro base station) serves another certain geographic area, denoted as a second (macro) cell 208. The plurality of UEs 214 located within the second cell 208 are served by the second macro eNodeB 206. The second macro eNodeB 206 communicates with the UEs 214 on the first carrier frequency 210 (F1) and optionally, one or more secondary carrier frequencies, such as the second carrier frequency 212 (F2).

The first and second cells 204, 208 may or may not be immediately co-located next to each other. However, the first and second cells 204, 208 are situated close enough to be considered neighboring cells, such that the user traffic pattern of one of the first or second eNodeB 202, 206 may be relevant to the other eNodeB. For example, one of the UE 214 served by the first eNodeB 202 may move from the first cell 204 to the second cell 208, in which case a hand-off takes places from the first eNodeB 202 to the second eNodeB 206 with respect to the particular UE 214. As another example, the respective coverage areas of the first and second cells 204, 208 may overlap with each other (e.g., first and second cells 204, 208 are overlapping or non-isolated cells). As still another example, the respective coverage areas of the first and second cells 204, 208 may be distinct or isolated from each other.

The UEs 214 may comprise a variety of devices that communicate within the wireless communications network 200 including, but not limited to, cellular telephones, smart phones, tablets, laptops, desktops, personal computers, servers, personal digital assistants (PDAs), web appliances, set-top box (STB), a network router, switch or bridge, and the like. The UEs 214 can comprise Release 8, 9, 10, 11, and/or later UEs.

It is understood that the wireless communications network 200 includes more than two eNodeBs. It is also understood that each of the first and second macro eNodeBs 202, 206 can have more than one neighboring eNodeB. As an example, the first macro eNodeB 202 may have six or more neighboring macro eNodeBs.

In one embodiment, the UEs 214 located in respective first or second cells 204, 208 transmits data to its respective first or second macro eNodeB 202, 206 (uplink transmission) and receives data from its respective first or second macro eNodeB 202, 206 (downlink transmission) using radio frames comprising Orthogonal Frequency-Division Multiple Access (OFDMA) frames configured for time division duplexing (TDD) operations. Each of the radio frames comprises a plurality of uplink and downlink subframes, the uplink and downlink subframes configured in accordance with the uplink-downlink ratio configuration selected from among the supported uplink-downlink ratio configurations shown in FIG. 1. (See 3GPP TS 36.211 Version 9.1.0, E-UTRA Physical Channels and Modulation (Release 9), March 2010.)

Figure 3:
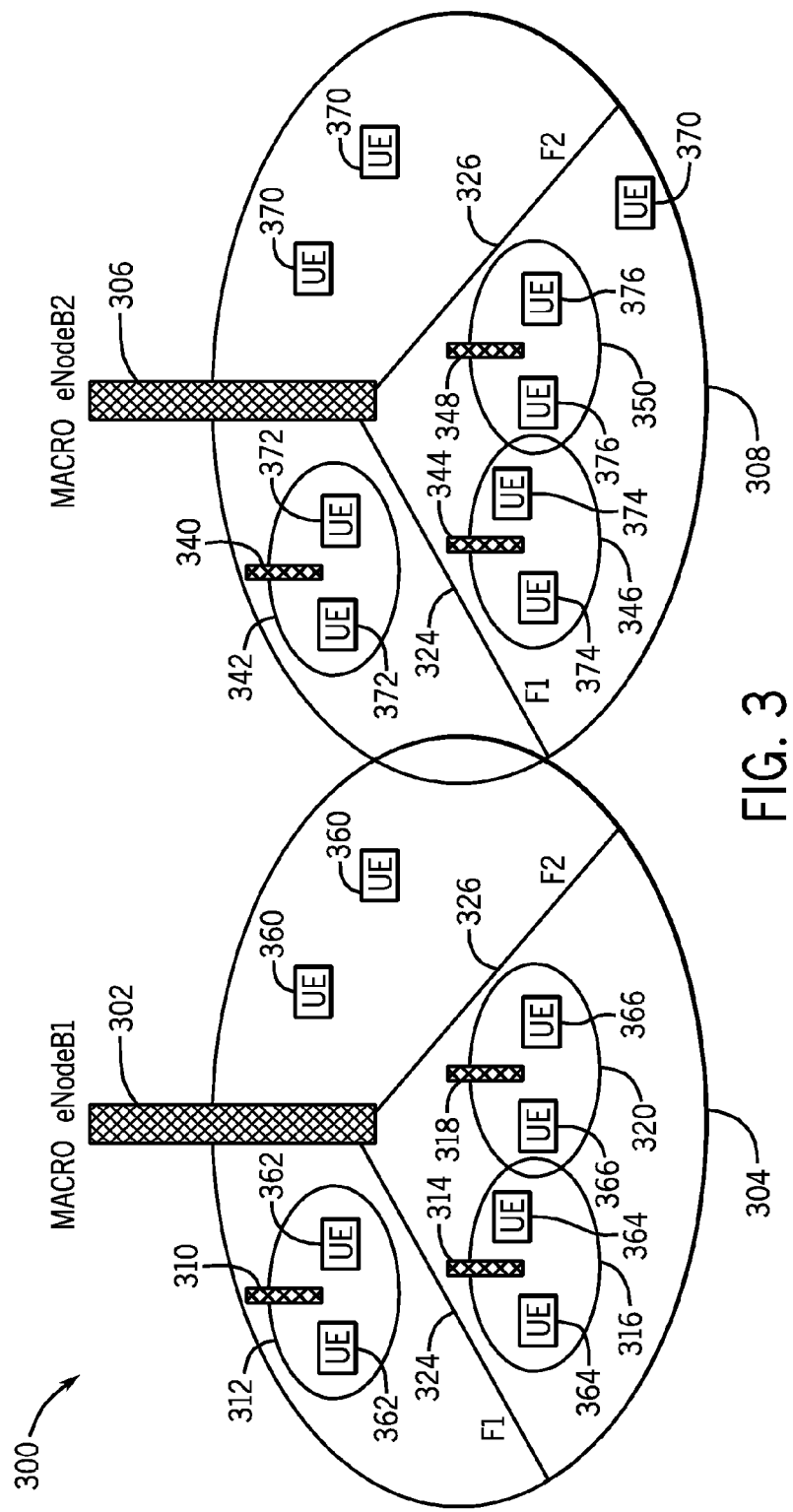
FIG. 3 illustrates an example (portion) of a wireless communications network shown in a heterogeneous network deployment according to some embodiments.

FIG. 3 illustrates an example (portion) of a wireless communication network 300 shown in a heterogeneous network deployment according to some embodiments. In one embodiment, the wireless communications network 300 comprises a EUTRAN using the 3GPP-LTE standard operating in TDD mode. The wireless communications network 300 includes a first macro eNodeB 302, a second macro eNodeB 306, a first low power (LP) eNodeB 310, a second LP eNodeB 314, a third LP eNodeB 318, a fourth LP eNodeB 340, a fifth LP eNodeB 344, and a sixth LP eNodeB 348. The LP eNodeBs 310, 314, 318, 340, 344, and 348 are also referred to as low power nodes (LPNs) or remote radio heads (RRHs).

The first macro eNodeB 302 (also referred to as eNodeB 1, macro eNodeB1, base station, or macro base station) serves a certain geographic area, denoted as a first macro cell 304. A plurality of UEs 360 located within the first macro cell 304 and associated with the first macro eNodeB 302 are served by the first macro eNodeB 302. The first macro eNodeB 302 communicates with the UEs 360 on a first carrier frequency 324 (F1) and optionally, one or more secondary carrier frequencies, such as a secondary carrier frequency 326 (F2). The first macro eNodeB 302, first macro cell 304, and UEs 360 are similar to the first macro eNodeB 202, first cell 204, and UEs 214, respectively.

The second macro eNodeB 306 is similar to the first macro eNodeB 302 except it serves a different cell from that of the first macro eNodeB 302. The second macro eNodeB 306 (also referred to as eNodeB2, macro eNodeB2, base station, or macro base station) serves another certain geographic area, denoted as a second macro cell 308. A plurality of UEs 370 located within the second macro cell 308 and associated with the second macro eNodeB 306 are served by the second macro eNodeB 306. The second macro eNodeB 306 communicates with the UEs 370 on the first carrier frequency 324 (F1) and optionally, one or more secondary carrier frequencies, such as the second carrier frequency 326 (F2). The second macro eNodeB 306, second macro cell 308, and UEs 370 are similar to the second macro eNodeB 206, second cell 208, and UEs 214, respectively.

Located within the geographic area of the first macro cell 304 are one or more LP eNodeBs or nodes, such as the first LP eNodeB 310, second LP eNodeB 314, and third LP eNodeB 318. The first LP eNodeB 310 serves a geographic area within the first macro cell 302, denoted as a first LP cell 312. UEs 362 located within the first LP cell 312 and associated with the first LP eNodeB 310 are served by the first LP eNodeB 310. The first LP eNodeB 310 communicates with the UEs 362 on the same or different frequencies as used by the first macro eNodeB 302 (e.g., first carrier frequency 324 (F1) and optionally, one or more secondary carrier frequencies, such as second carrier frequency 326 (F2)). The second LP eNodeB 314 serves a geographic area within the first macro cell 302, denoted as a second LP cell 316. UEs 364 located within the second LP cell 316 and associated with the second LP eNodeB 314 are served by the second LP eNodeB 314. The second LP eNodeB 314 communicates with the UEs 364 on the same or different frequencies as used by the first macro eNodeB 302 (e.g., first carrier frequency 324 (F1) and optionally, one or more secondary carrier frequencies, such as second carrier frequency 326 (F2)). The third LP eNodeB 318 serves a geographic area within the first macro cell 302, denoted as a third LP cell 320. UEs 366 located within the third LP cell 320 and associated with the third LP eNodeB 318 are served by the third LP eNodeB 318. The third LP eNodeB 318 communicates with the UEs 366 on the same or different frequencies as used by the first macro eNodeB 302 (e.g., first carrier frequency 324 (F1) and optionally, one or more secondary carrier frequencies, such as second carrier frequency 326 (F2)).

Located within the geographic area of the second macro cell 308 are one or more LP eNodeBs or nodes, such as the fourth LP eNodeB 340, fifth LP eNodeB 344, and sixth LP eNodeB 348. The fourth LP eNodeB 340 serves a geographic area within the second macro cell 306, denoted as a fourth LP cell 342. UEs 372 located within the fourth LP cell 342 and associated with the fourth LP eNodeB 340 are served by the fourth LP eNodeB 340. The fourth LP eNodeB 340 communicates with the UEs 372 on the same or different frequencies as used by the second macro eNodeB 306 (e.g., first carrier frequency 324 (F1) and optionally, one or more secondary carrier frequencies, such as second carrier frequency 326 (F2)). The fifth LP eNodeB 344 serves a geographic area within the second macro cell 308, denoted as a fifth LP cell 346. UEs 374 located within the fifth LP cell 346 and associated with the fifth LP eNodeB 344 are served by the fifth LP eNodeB 344. The fifth LP eNodeB 344 communicates with the UEs 374 on the same or different frequencies as used by the second macro eNodeB 306 (e.g., first carrier frequency 324 (F1) and optionally, one or more secondary carrier frequencies, such as second carrier frequency 326 (F2)). The sixth LP eNodeB 348 serves a geographic area within the second macro cell 308, denoted as a sixth LP cell 350. UEs 376 located within the sixth LP cell 350 and associated with the sixth LP eNodeB 348 are served by the sixth LP eNodeB 348. The sixth LP eNodeB 348 communicates with the UEs 376 on the same or different frequencies as used by the second macro eNodeB 306 (e.g., first carrier frequency 324 (F1) and optionally, one or more secondary carrier frequencies, such as second carrier frequency 326 (F2)).

Each of the LP eNodeBs 310, 314, 318, 340, 344, and 348 comprises a femto, pico, low power, or short range eNodeB (or node or base station) operating at a significantly lower power level and communication range relative to the macro eNodeB associated with the macro cell in which it is located. The LP eNodeBs 310, 314, 318, 340, 344, and 348 may operate in accordance with commands from its respective macro eNodeB or may be capable of independent operation.

The first and second macro cells 304, 308 may or may not be immediately co-located next to each other. However, the first and second macro cells 304, 308 are situated close enough to be considered neighboring cells, such that the user traffic pattern of one of the first or second macro eNodeB 302, 306 may be relevant to the other eNodeB. For example, one of the UE 360 served by the first macro eNodeB 302 may move from the first macro cell 304 to the second macro cell 308, in which case a hand-off takes places from the first macro eNodeB 302 to the second macro eNodeB 306 with respect to the particular UE 360. As another example, the respective coverage areas of the first and second macro cells 304, 308 may overlap with each other (e.g., first and second macro cells 304, 308 are overlapping or non-isolated cells). As still another example, the respective coverage areas of the first and second macro cells 304, 308 may be distinct or isolated from each other.

One or more of the LP cells 312, 316, and 320 located within the first macro cell 304 may or may not be isolated cells. For example, FIG. 3 shows first LP cell 312 as an isolated cell and each of the second and third LP cells 316, 320 as overlapping or non-isolated cells to each other. One or more of the LP cells 342, 346, and 350 located within the second macro cell 308 may or may not be isolated cells. For example, FIG. 3 shows fourth LP cell 342 as an isolated cell and each of the fifth and sixth LP cells 346, 350 as overlapping or non-isolated cells to each other.

The UEs 360, 362, 364, 366, 370, 372, 374, and 376 may comprise a variety of devices that communicate within the wireless communications network 300 including, but not limited to, cellular telephones, smart phones, tablets, laptops, desktops, personal computers, servers, personal digital assistants (PDAs), web appliances, set-top box (STB), a network router, switch or bridge, and the like. The UEs 360, 362, 364, 366, 370, 372, 374, and 376 can comprise Release 8, 9, 10, 11, and/or later UEs. The UEs 360, 362, 364, 366, 370, 372, 374, and 376 can be similar to each other and to the UEs 214. The UEs 360, 362, 364, 366, 370, 372, 374, and 376 transmit and receive data with its respective eNodeB in accordance with the selected UL/DL ratio configuration for the respective eNodeB. Although UEs 360, 362, 364, 366, 370, 372, 374, and 376 are shown associated with respective eNodeBs, it is understood that any of the UEs 360, 362, 364, 366, 370, 372, 374, and 376 can move in or out of a given cell to another cell and be associated with a different eNodeB.

It is understood that the wireless communications network 300 includes more than two macro eNodeBs. It is also understood that each of the first and second macro eNodeBs 302, 306 can have more than one neighboring eNodeB. As an example, the first macro eNodeB 302 may have six or more neighboring eNodeBs. It is further understood that any of the macro cells can include zero, one, two, three, or more LP cells within its area.

Each of the eNodeBs 302, 306, 310, 314, 318, 340, 344, and 348 communicates with its respective UEs in accordance with a specific UL/DL configuration. The UL/DL configuration can be the same or different among the eNodeBs 302, 306, 310, 314, 318, 340, 344, and 348 depending on predetermined or current operating conditions.

Each of the networks 200 and 300 may comprise a 3GPP-LTE network operating in Time Division Duplex (TDD) or Frequency Division Duplex (FDD) mode.

Figure 4:
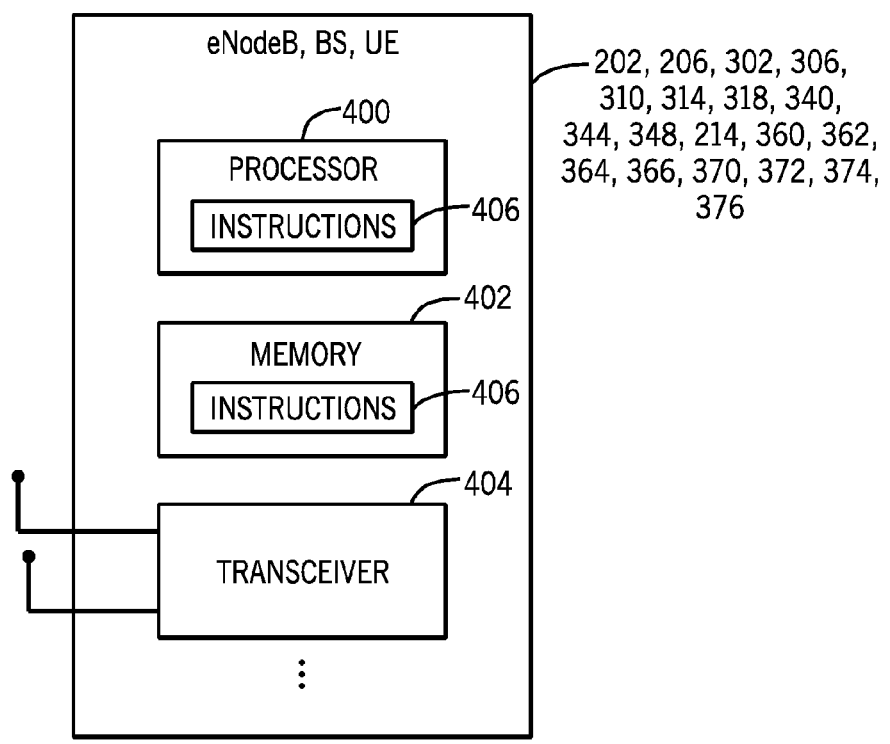
FIG. 4 illustrates an example block diagram showing details of the eNodeBs and UEs included in the wireless communications network of FIG. 2 or 3 according to some embodiments.

FIG. 4 illustrates an example block diagram showing details of each of eNodeBs 202, 206, 302, 306, 310, 314, 318, 340, 344, 348 and/or UEs 214, 360, 362, 364, 366, 370, 372, 374, 376 according to some embodiments. Each of the eNodeBs 202, 206, 302, 306, 310, 314, 318, 340, 344, 348 and/or UEs 214, 360, 362, 364, 366, 370, 372, 374, 376 includes a processor 400, a memory 402, a transceiver 404, instructions 406, and other components (not shown).

The processor 400 comprises one or more central processing units (CPUs), graphics processing units (GPUs), or both. The processor 400 provides processing and control functionalities for the eNodeB/UE. Memory 402 comprises one or more transient and static memory units configured to store instructions and data for the eNodeB/UE. The transceiver 404 comprises one or more transceivers including a multipleinput and multiple-output (MIMO) antenna to support MIMO communications. The transceiver 404 receives uplink transmissions and transmits downlink transmissions, among other things, with the UEs.

The instructions 406 comprises one or more sets of instructions or software executed on a computing device (or machine) to cause such computing device (or machine) to perform any of the methodologies discussed herein. The instructions 406 (also referred to as computer- or machine-executable instructions) may reside, completely or at least partially, within the processor 400 and/or the memory 402 during execution thereof by the eNodeB/UE. The processor 400 and memory 402 also comprise machine-readable media.

In heterogeneous networks, a concern is that the Release-8 control region (physical downlink control channel (PDCCH)/PHICH) is shared by all the cells in a macro area. Interference is the control region is thus likely to be very high and the reliability of PHICH should be enhanced. For heterogeneous networks in which the transmission/reception points created by the LPNs located within a given macro eNodeB have the same cell identifier as the given macro cell, PHICH capacity is an issue due to the large number of UEs associated with a macro cell.

In Release 11 or later implementation, inter-band aggregation of component carriers (CCs) with different TDD UL/DL configurations can be used to enhance legacy system (e.g., Release 8/9/10) co-existence, Hetnet support, aggregation of traffic-dependent carriers, and high peak data rate. When the UL/DL configuration for a CC has more downlink (DL) subframes than uplink (UL) subframes, the CC is said to be DL heavy, one potential issue is a discrepancy in the PHICH/PDCCH resources between legacy UEs and inter-band CA UEs if the PHICH channel is needed to feedback on the DL subframes with no PHICH resources based on the legacy PHICH timeline of scheduling cell (primary cell or PCell).

Figure 5:
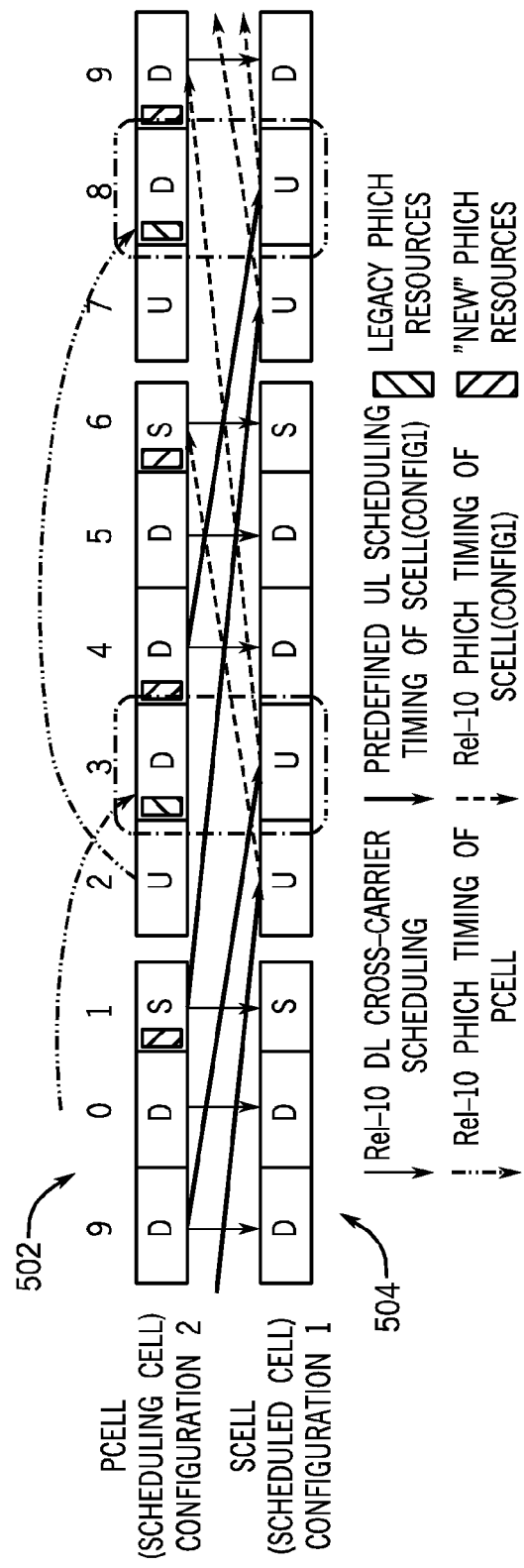
FIG. 5 illustrates an example diagram showing radio frame structures for a scheduling cell (PCell) and a scheduled cell (secondary cell or SCell).

FIG. 5 illustrates an example diagram showing radio frame structures for a scheduling cell (PCell) 502 and a scheduled cell (secondary cell or SCell) 504. The PCell is configured for UL/DL Configuration 2 and the SCell is configured for UL/DL Configuration 1. For legacy UEs, only Subframes 3 and 8 of each radio frame are recognized for DL hybrid automatic repeat request-acknowledge (HARQ-ACK) feedback in the PHICH channel by the UEs. For the TDD inter-band CA UEs, there exists PHICH resources in Subframes 1, 4, 6, and 9 corresponding to the physical uplink shared channel (PUSCH) subframes in the SCell in order to provide feedback of all of the DL HARQ-ACK information for PUSCH of the SCell. An enhanced physical hybrid ARQ indicator channel (e-PHICH) design disclosed herein addresses the discrepancy in the PHICH resources between legacy UEs and inter-band CA UEs with limited standard impact and implementation complexity.

Figure 6:
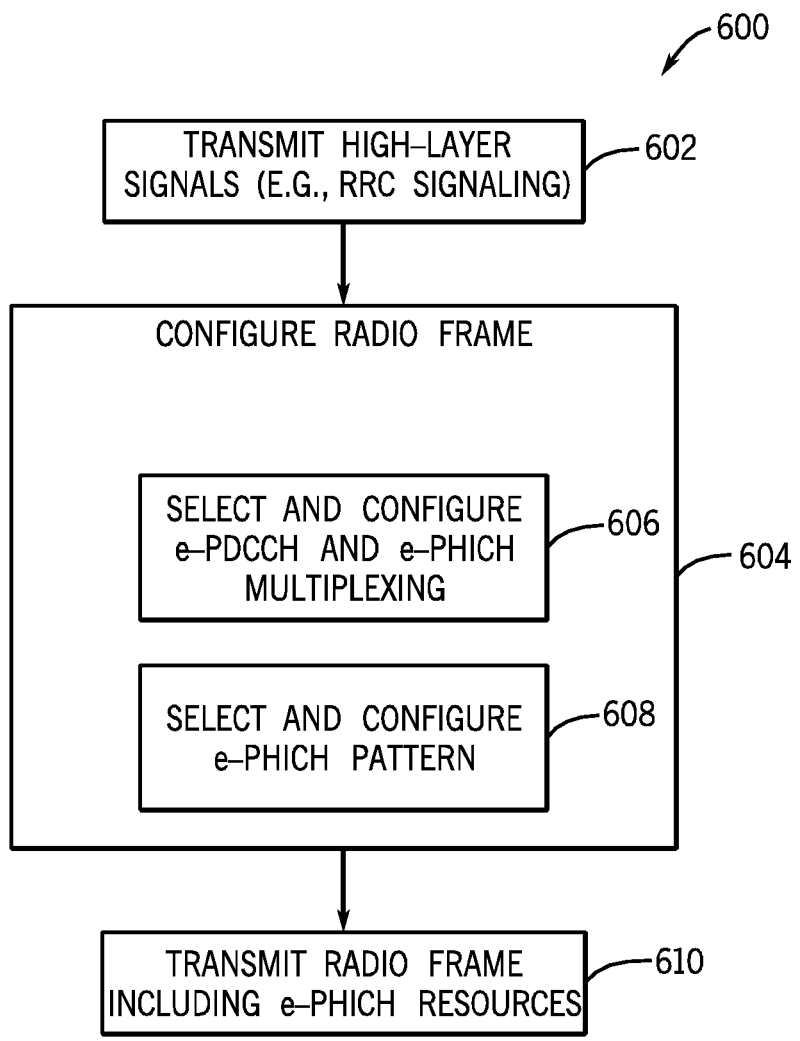
FIG. 6 illustrates an example flow diagram showing operations and functionalities performed by an eNodeB in connection with providing e-PHICH resources according to some embodiments.

FIG. 6 illustrates an example flow diagram 600 showing operations and functionalities performed by an eNodeB in connection with providing e-PHICH resources according to some embodiments. The e-PHICH resources increase PHICH channel capacity using little control overhead capacity. The e-PHICH resources are provided by multiplexing with the existing legacy physical signals, e.g., the PDCCH region, enhanced PDCCH (e-PDCCH) design, common reference signal (CRS), demodulation reference signals (DM-RS), and UE-specific RS for transmission mode 7. (See 3GPP TS 36.213 Version 10.5.0, E-UTRA Physical Layer Procedures (Release 10), March 2012.)

At a block 602, an eNodeB provides high-layer signaling—such as, but not limited to, radio resource control (RRC) signaling, L1 signaling, or using a signaling layer higher than the physical layer—to UEs associated with the eNodeB specifying the existence of either e-PHICH resources or legacy (Rel-8/9/10) PHICH resources for the HARQ-ACK corresponding to the PUSCH. The high-layer signaling may comprise broadcast high-layer signaling (broadcast to all UEs associated with the eNodeB), or dedicated high-layer signaling (communicated to less than all of the UEs and only to those UE(s) for which e-PHICH resources are being allocated). The high-layer signaling information informs the UEs to look for the appropriate PHICH/e-PHICH resources in the radio frames. For discussion purposes, the high-layer signaling provided by the eNodeB specifies the existence of e-PHICH resources.

Figure 7A:
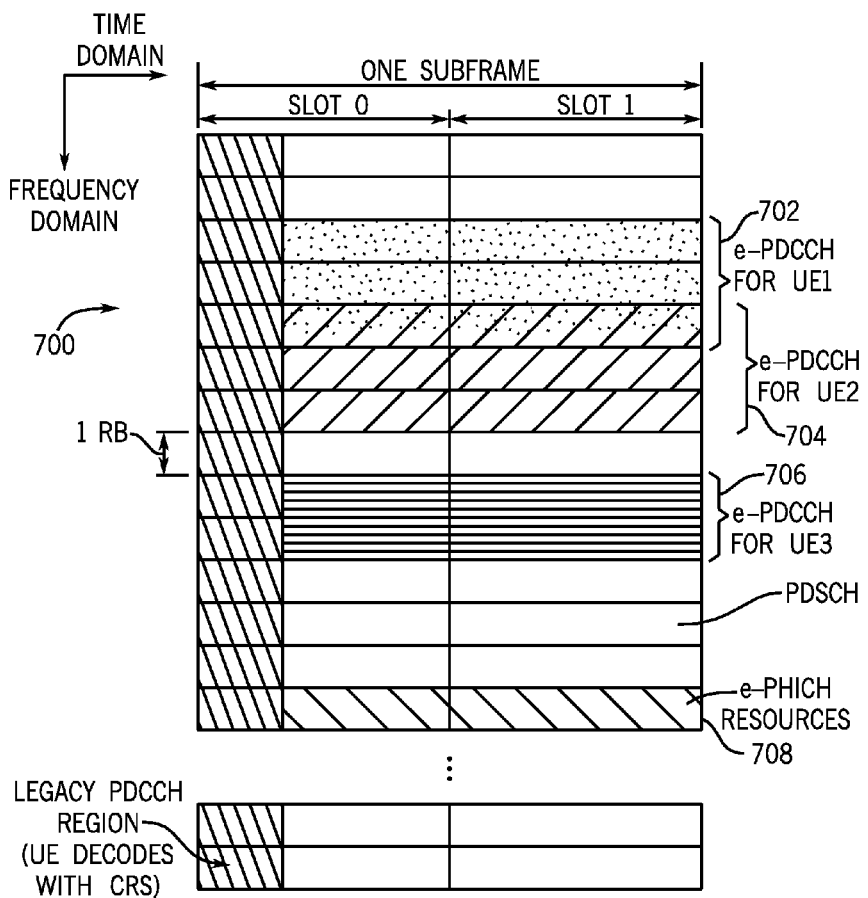
FIG. 7A illustrates an example subframe of a radio frame showing a resource block structure allocated using frequency-division multiplexing.

Next at a block 604, the eNodeB configures a radio frame including e-PHICH resources. At a sub-block 606 of block 604, the eNodeB selects and configures an e-PDCCH and e-PHICH multiplexing in accordance with the high-layer signaling. In one embodiment, an e-PDCCH and e-PHICH multiplexing scheme comprises multiplexing the e-PDCCH and e-PHICH with frequency-division multiplexing (FDM). FIG. 7A illustrates an example subframe 700 of a radio frame showing a resource block structure allocated using FDM. Each "row" shown in FIG. 7A represents a unique resource block (RB) index having a specific frequency. The e-PDCCH and e-PHICH resources comprise RB indices. The allocation of RB indices is pre-defined and the UEs are informed accordingly via broadcast or dedicated high-layer signaling (in block 602). The e-PDCCH resources are allocated on different RB indices (e.g., different frequencies) from the e-PHICH resources. RB indices 702 are allocated for e-PDCCH resources for a first UE (UE1), RB indices 704 are allocated for e-PDCCH resources for a second UE (UE2), RB indices 706 are allocated for e-PDCCH resources for a third UE (UE3), and the like for other UEs. Although more than one RB index is shown allocated for each given UE, it is understood that a single RB index may be allocated for each of the one or more UEs. Separate RB indices 708 are allocated for e-PHICH resources. In the time domain, each of the RB indices 702, 704, 706, 708 comprise Slot 0 and Slot 1 of the subframe 700 except for the legacy PDCCH (control) region. The RB indices 702, 704, 706, 708 may also be referred to as RB candidates or RBs. This scheme maintains Rel-8 Walsh-cover multiplexing without requiring UE-specific scrambling for e-PHICH multiplexing.

In another embodiment, an e-PDCCH and e-PHICH multiplexing scheme comprises locating the e-PHICH resource in one of the RB candidates allocated for UE-specific e-PDCCH transmission. The DL HARQ-ACKs for multiple UEs are coded-multiplexed within one e-PHICH group as in Release 8. The UEs are informed of the e-PHICH RB index explicitly via RRC signaling or informed implicitly with some pre-defined principle. For example, the first single or first several RBs of e-PDCCH candidates for a specific one of the UE are used for e-PHICH transmission implicitly. The existence of such e-PHICH may be communicated to the corresponding UE(s) via dedicated RRC signaling to minimize control overhead. In turn, the e-PHICH information is demodulated by the corresponding UE(s) using user equipment reference signals (UE-RS).

Figure 7B:
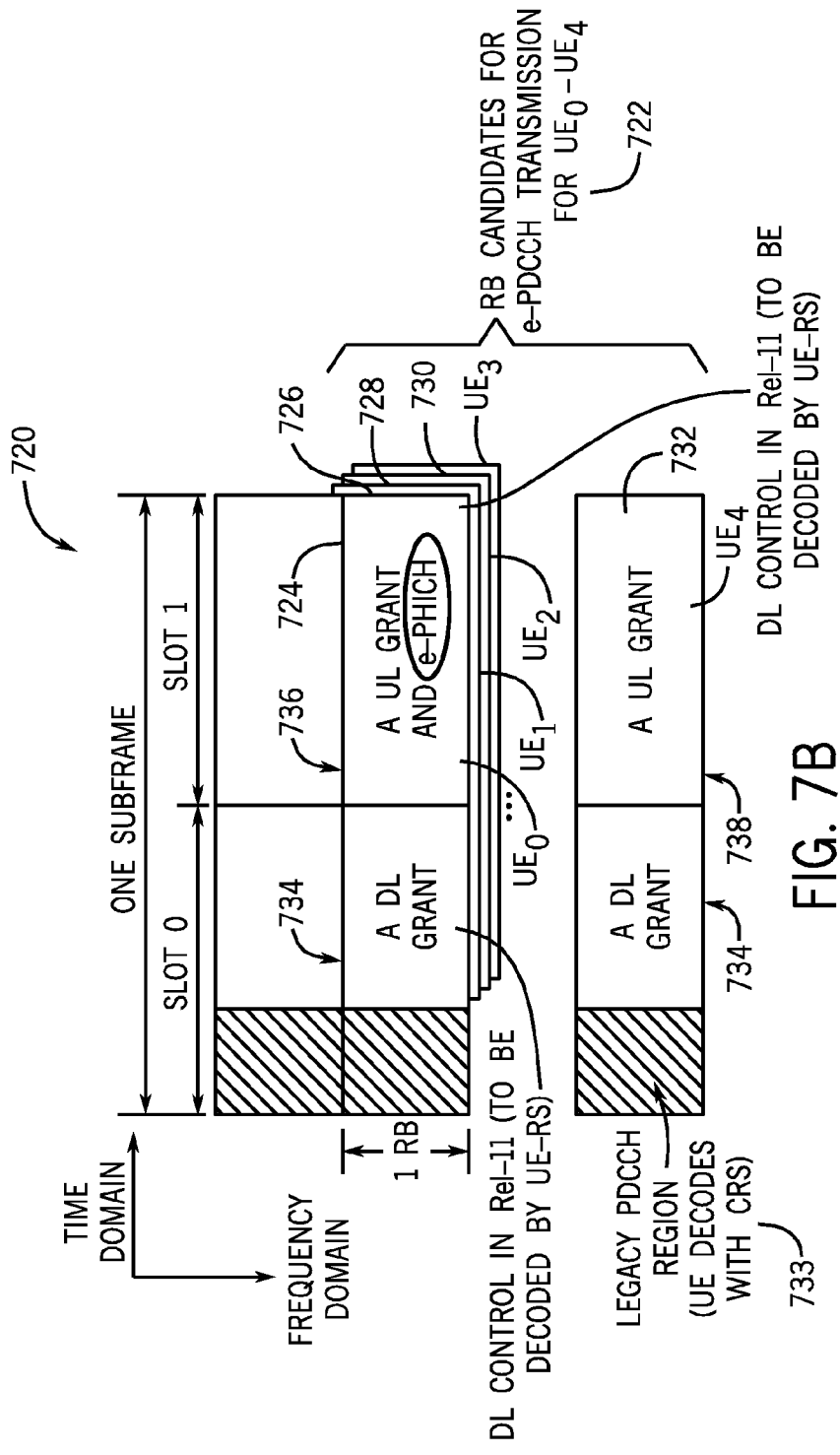
FIG. 7B illustrates an example subframe of a radio frame showing a resource block structure with the e-PHICH co-located with the e-PDCCH in at least one of the RB candidates allocated for UE-specific e-PDCCH transmission.

FIG. 7B illustrates an example subframe 720 of a radio frame showing a resource block structure with the e-PHICH co-located with the e-PDCCH in at least one of the RB candidates allocated for UE-specific e-PDCCH transmission. Each "row" shown in FIG. 7B represents a unique RB (index) having a specific frequency. RB candidates 722 for e-PDCCH resources/transmission are shown for each of UE0, UE1, UE2, UE3, and UE4. In the frequency domain, a RB candidate (also referred to as RB or RB index) at a first layer 724 is associated with UE0. A RB candidate at a second layer 726 is associated with UE1. A RB candidate at a third layer 728 is associated with UE2. A RB candidate at a fourth layer 730 is associated with UE3. RB candidate layers 724-730 are different layers at the same RB index. A RB candidate 732 that is a different RB index from RB candidate layers 724-730 is associated with UE4. Each of the RB candidate layers 724-730 and RB candidate 732 includes allocation of e-PDCCH resources for a particular UE. At least one of the layers of RB candidate layers 724-730 also includes allocation of e-PHICH resources (e.g., e-PHICH co-located with e-PDCCH resources on same RB candidate). No e-PHICH resource is co-located with e-PDCCH resource for RB candidate 732. Although a single RB index is shown for each of RB candidate layers 724-730 and RB candidate 732, it is understood that one or more RB indices may be allocated for each of one or more specific UEs.

In the time domain, subframe 720 is divided into two portions, a Slot 0 and a Slot 1. In Slot 0, a first portion 733 comprises a legacy PDCCH control region (to be decoded by the UEs with common reference signal (CRS)) and a second portion 734 is allocated for DL grant for a specific UE (to be decoded by UE-RS). Slot 1 is allocated for at least UL grant 736 for the same specific UE as in Slot 0 (to be decoded by UE-RS). Each of the RB candidate layers 724-730 and RB candidate 732 have such allocations for their respective Slots 0 and 1. For one or more layers of the RB candidate layers 724-730, as described in detail below, Slot 1 also allocates e-PHICH resources for one or more layers of the RB candidate layers 724-730.

When e-PHICH is co-located with e-PDCCH in the same RB, at least two resource element (RE) mapping is contemplated. In one embodiment, the RE sets used for e-PHICH are orthogonal with RE sets used for e-PDCCH regardless of whether the e-PHICH allocation is located in the same or different layer from the e-PDCCH allocation. The RE sets of all of the e-PDCCH layers are punctured by the RE sets of the e-PHICH even if the e-PHICH is transmitted in only one of the multi-layers of a given RB. The RE sets of the e-PHICH are applicable for all of the e-PDCCH layers for the same RB.

In another embodiment, the RE sets used for e-PHICH are orthogonal with RE sets used for e-PDCCH in the same layer only. There is no puncturing of RE sets for e-PDCCH even in the Physical Resource Block (PRB) of e-PHICH if they are mapped to different layers of a given RB. For both embodiments, the eNodeB signals whether there is e-PDCCH puncturing or not via high-layer signaling (in block 602), and the UEs are informed accordingly.

Figure 7C:
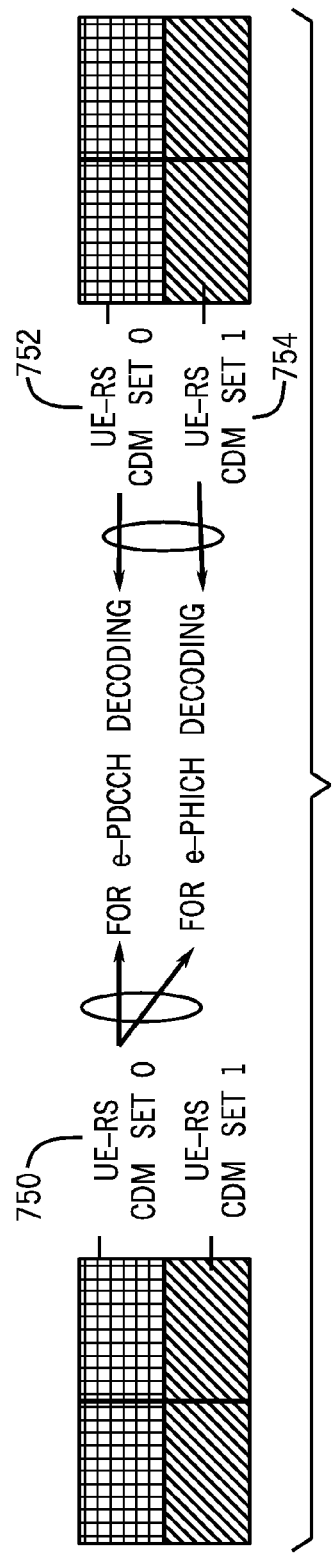
FIG. 7C illustrates an example block diagram showing use of the same or different UE-RS CDM group for control decoding/demodulating the e-PDCCH and e-PHICH information included in the radio frames.

Moreover when e-PHICH is co-located with e-PDCCH in the same RB, the eNodeB assigns the same or different UE-RS Code Division Multiplexing (CDM) group for e-PHICH information decoding and e-PDCCH information decoding. This permits the UEs to properly demodulate the e-PHICH and e-PDCCH resource information. The assignment information is included in the high-layer signaling in block 602. FIG. 7C illustrates an example block diagram showing use of the same or different UE-RS CDM group for control decoding/demodulating the e-PDCCH and e-PHICH information included in the radio frames. In one embodiment, a same UE-RS CDM group/set 750 may be assigned to decode both e-PDCCH and e-PHICH. In another embodiment, a first UE-RS CDM group/set 752 may be assigned for e-PDCCH decoding and a second UE-RS CDM group/set 754 may be assigned for e-PHICH decoding.

At a sub-block 608 of block 604, the eNodeB selects and configures the e-PHICH allocation at a resource element groups (REGs) level. Sub-blocks 606 and 608 may occur simultaneously with each other or in reverse order from that shown in FIG. 6. A resource element (RE) comprises the smallest modulation structure in LTE for assigning resources in the frequency domain. A single RE is one 15 kHz subcarrier (in the frequency domain) by one symbol (in the time domain). Four REs comprise one REG. The REs within a given REG may or may not be contiguous with each other. Twelve consecutive 15 k Hz subcarriers in the frequency domain and six or seven symbols in the time domain form a resource block (RB). Each subframe divides into two slots (Slot 0 and Slot 1), each slot being 0.5 ms in length. In the time domain, each slot is one RB long. Ten subframes make up a radio frame.

In one embodiment, the number of REGs (also referred to as the REG aggregation level) for each e-PHICH channel is three REGs, as provided in the Release 10 technical standards.

In another embodiment, the REG aggregation level for the e-PHICH is dynamically switchable or defined from among a plurality of different pre-defined REG aggregation levels by the eNodeB. The pre-defined set of candidate REG aggregation levels is specified in the RRC signaling (or L1 signaling) information in block 602. The particular REG aggregation level of e-PHICH corresponds to a control channel element (CCE) aggregation level of the latest UL grant, if it exists. For instance, assume four REG aggregation levels of e-PHICH are pre-defined as $[N_{REG,1}, N_{REG,2}, N_{REG,3}, N_{REG,4}]$ that correspond one-to-one with four CCE aggregation levels of PDCCH designated as $[N_{CCE,1}, N_{CCE,2}, N_{CCE,3}, N_{CCE,4}]=[1, 2, 4, 8]$. Then if a UE detects a downlink control information (DCI) message included in the PDCCH with UL grant at aggregation level $CCE_i$, where $1=<i=<4$, intended for that UE, the REG aggregation level for the e-PHICH is $REG_i$ aggregation level. The DCI message comprises the latest DCI message used for initial transmission or re-transmission of a corresponding uplink data transmission associated with the e-PHICH.

It is also possible that multiplexed CCE aggregation level is implicitly linked with one pre-defined REG aggregation level. For the non-adaptive PUSCH retransmission case (e.g., PUSCH retransmission triggered by e-PHICH), the REG aggregation level of e-PHICH may be the same as the aggregation level of the most recent e-PHICH associated with the corresponding PUSCH. The REG aggregation level of e-PHICH keeps up with the UE's latest signal-to-noise ratio (SNR) geometry, which facilitates improved HARQ-ACK performance.

In still another embodiment, the REG aggregation level of e-PHICH is semi-statically configured for a given UE. The given UE is informed of the current REG aggregation level of e-PHICH via high-layer signaling, such as RRC signaling or L1 signaling in block 602.

Figure 8A:
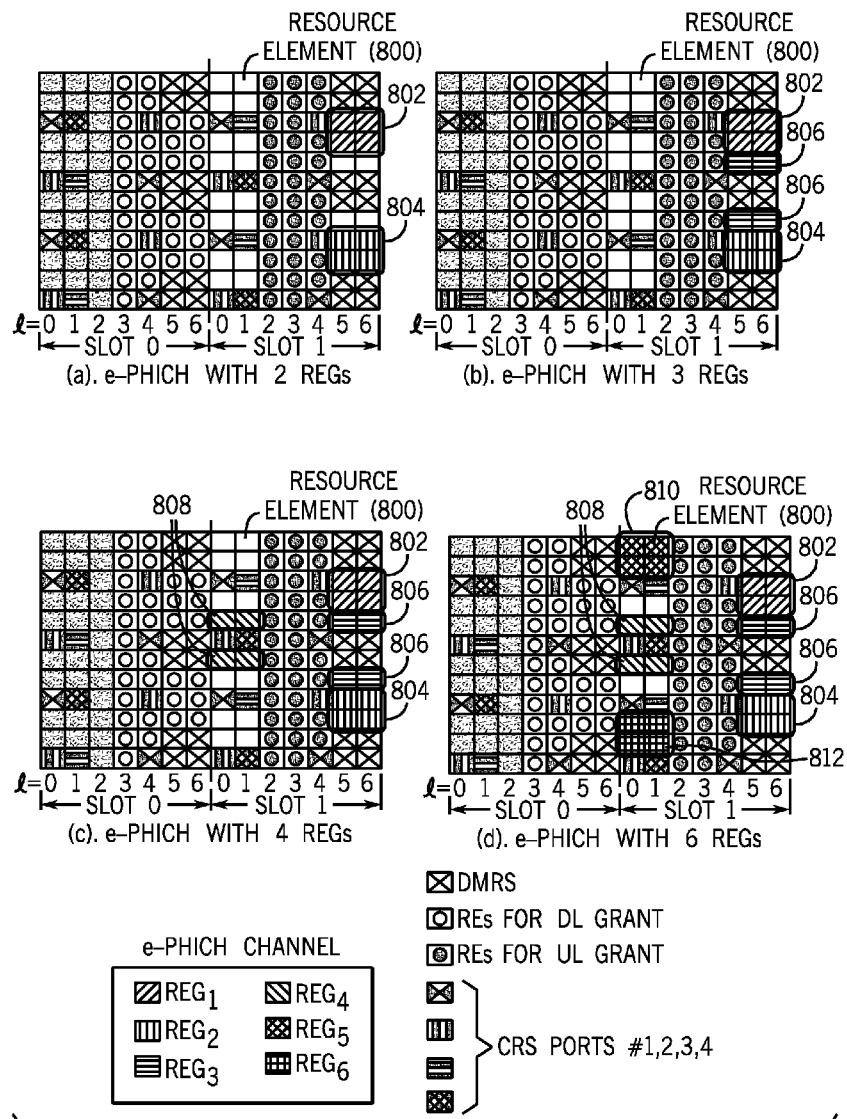
FIGS. 8A-8D illustrate example e-PHICH patterns according to some embodiments.

Once a particular REG aggregation level of e-PHICH has been decided, the particular mapping of the REG aggregation level—referred to as the e-PHICH pattern—is determined based on the following design principles. Note that an e-PHICH pattern can be allocated solely in Slot 1 or in both Slot 0 and Slot 1 of a subframe. The design principles below can be applied independently or in combination of two, three, or more principles:

(1) The e-PHICH patterns comprise nested REG structures. The REs of the e-PHICH pattern corresponding to $N_{REG,i}$, is a subset of REs of the e-PHICH pattern corresponding to $N_{REG,j}$, wherein i<j. In other words, the e-PHICH pattern for a higher REG aggregation level includes the entire e-PHICH pattern for the smaller REG aggregation level. An example of the nested structure property is shown in FIG. 8A.

(2) The e-PHICH patterns for the different REG aggregation levels are distributed evenly, or as evenly as possible, between even and odd slots (Slot 0 and Slot 1) of a subframe.

(3) The REs used to form the REGs of a given e-PHICH pattern are allocated between nearby reference symbols (RSs) in order to improve channel estimation performance.

(4) The REGs of a given e-PHICH pattern are allocated to even out the available REs for e-PDCCH transmission and to reduce performance imbalance between different slots.

(5) The REs used to form the REGs of a given e-PHICH pattern are allocated evenly, or as evenly as possible, into different OFDM symbols to obtain time domain diversity gain and to enable PHICH power boosting.

Based on the above design principles, example e-PHICH patterns are realized as illustrated in FIGS. 8A-8D. In FIG. 8A, example e-PHICH patterns for REG aggregation levels $[N_{REG,1}, N_{REG,2}, N_{REG,3}, N_{REG,4}]=[2, 3, 4, 6]$ are shown exhibiting the nested structure property. The e-PHICH is multiplexed with e-PDCCH. The benefit of nested structure design is to multiplex the HARQ-ACK for multiple UEs, which require different e-PHICH REG aggregation levels, into the same e-PHICH RB with minimal e-PHICH overhead. The smallest square shown in FIG. 8A represents a RE 800. The e-PHICH pattern with two REGs (REG aggregation level $N_{REG,1}=2$) comprises a REG 802 and a REG 804. The e-PHICH pattern with three REGs (REG aggregation level $N_{REG,2}=3$) comprises the REGs 802 and 804 (identical to the e-PHICH pattern with two REGs) and a REG 806 (shown as two non-contiguous portions). Notice that the e-PHICH pattern with two REGs is a subset of the e-PHICH pattern with three REGs. The e-PHICH pattern with four REGs (REG aggregation level $N_{REG,3}=4$) comprises the REGs 802, 804, and 806 (identical to the e-PHICH pattern with three REGs) and a REG 808 (shown as two non-contiguous portions). The e-PHICH pattern with six REGs (REG aggregation level $N_{REG,4}=6$) comprises the REGs 802, 804, 806, and 808 (identical to the e-PHICH pattern with four REGs), a REG 810, and a REG 812.

Figure 8B:
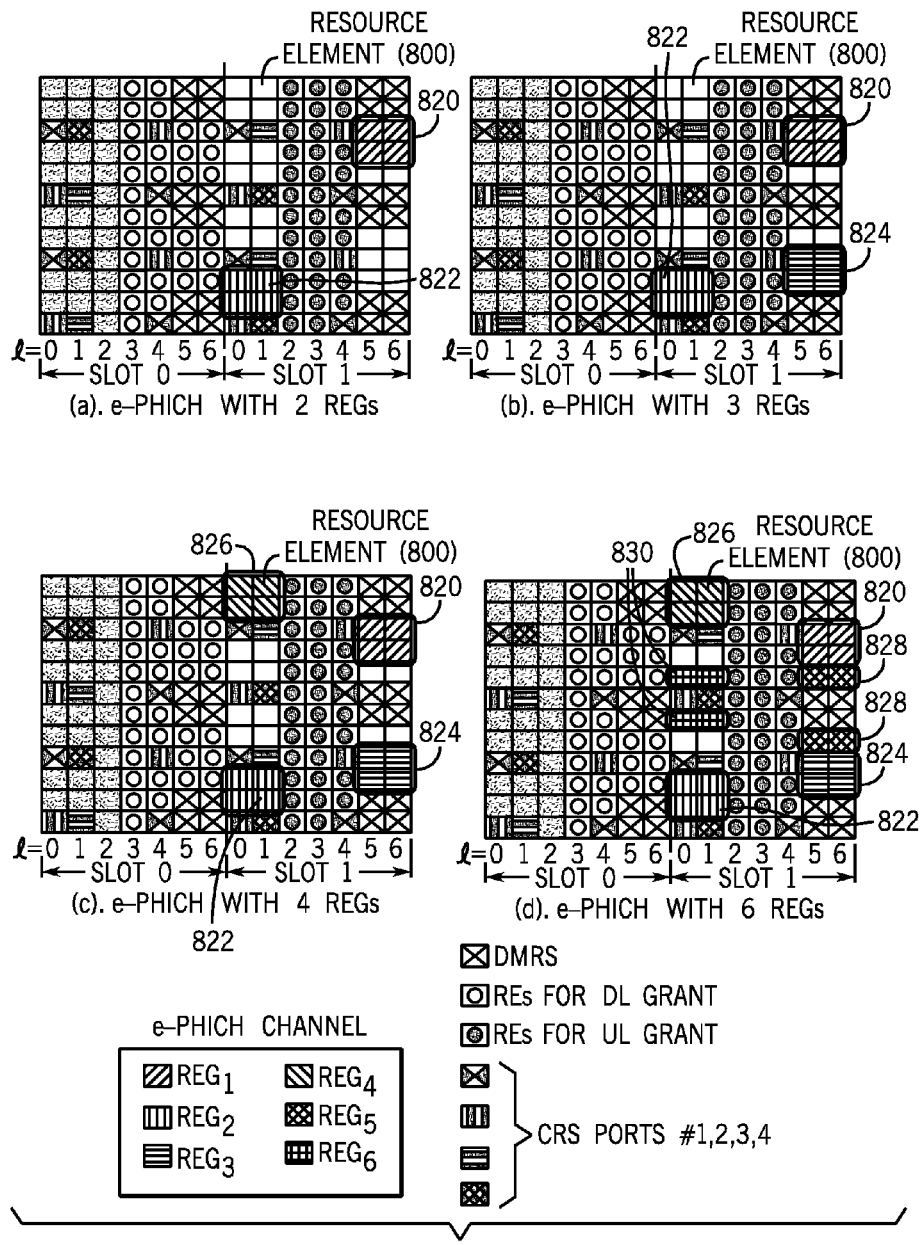

FIG. 8B illustrates example e-PHICH patterns structured in accordance with at least design principles (1), (4), and (5). In particular, note that the REGs for a given e-PHICH pattern are allocated in different portions (e.g., different subcarriers and/or symbols) within a given slot of the subframe. The e-PHICH pattern with two REGs comprises a REG 820 and a REG 822, REGs 820 and 822 allocated at different subcarrier and symbol positions relative to each other within Slot 1 of the subframe. The e-PHICH pattern with three REGs comprises REG 820, REG 822, and a REG 824. The allocation of REGs 820, 822, and 824 differ from each other in at least one of subcarrier or symbol positions. Each of the e-PHICH patterns with four REGs and six REGs, respectively, similarly illustrate the even distribution of REGs for a given e-PHICH pattern. The e-PHICH pattern with four REGs comprises REG 820, 822, 824 and a REG 826. The e-PHICH pattern with six REGs comprises REG 820, 822, 824, 826, a REG 828 (non-contiguous), and a REG 830 (non-contiguous).

Figure 8C:
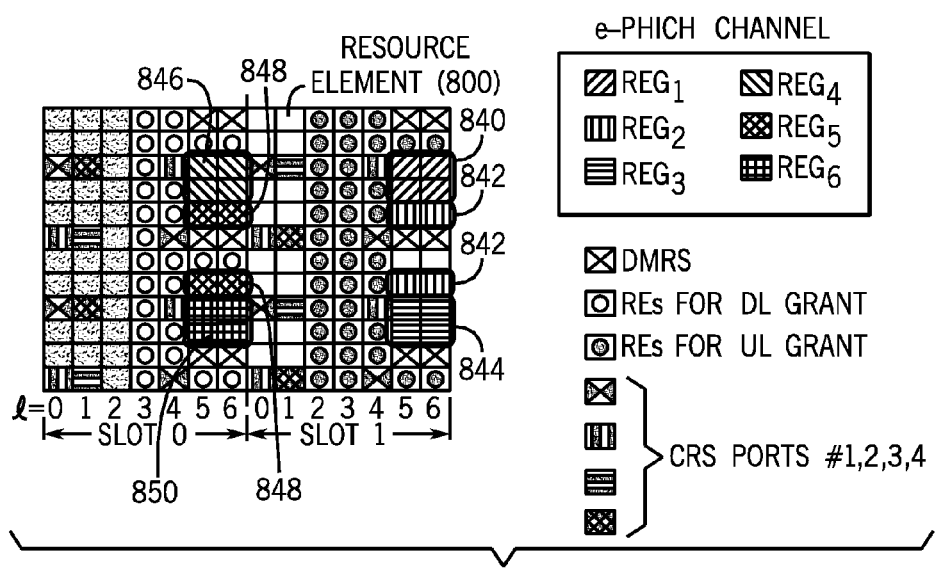

FIG. 8C illustrates an example e-PHICH pattern with six REGs showing its REGs allocated in both Slots 0 and 1 of a given single subframe (e.g., design principle (2)). The e-PHICH pattern includes a REG 840, a REG 842 (non-contiguous), and a REG 844 allocated in Slot 1, and a REG 846, a REG 848 (non-contiguous), and a REG 850 allocated in Slot 0. Although the e-PHICH patterns for other REG aggregation levels are not shown, it is understood that the REGs of such e-PHICH patterns can also be allocated in both Slots 0 and 1.

Figure 8D:
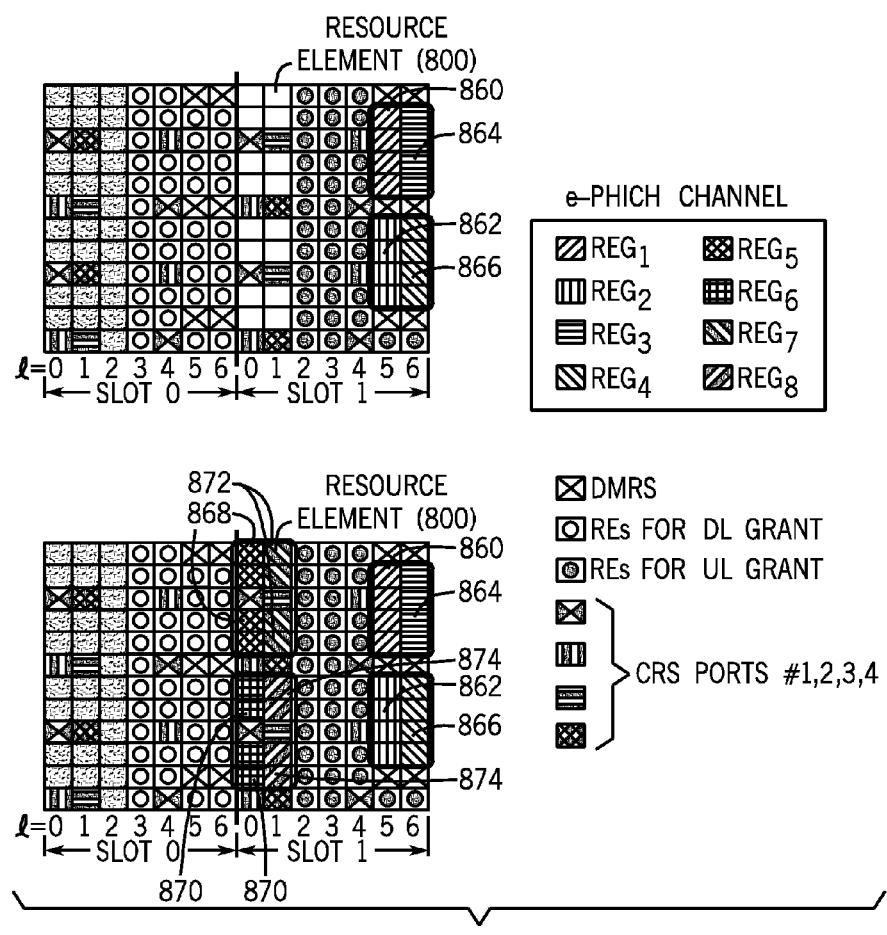

FIG. 8D illustrates example e-PHICH patterns having REGs distributed in the frequency domain. Each of the four REs included in a given REG is allocated on a different subcarrier frequency from each other. The top e-PHICH pattern has four REGs 860, 862, 864, and 866. The bottom e-PHICH pattern has eight REGs 860, 862, 864, 866, 868 (non-contiguous), 870 (non-contiguous), 872 (non-contiguous), and 874 (non-contiguous). It is understood that e-PHICH patterns for other REG aggregation levels can be similarly structured.

With the radio frame configured including the e-PHICH resource information, the eNodeB transmits the radio frame to the UEs at a block 610.

Figure 9:
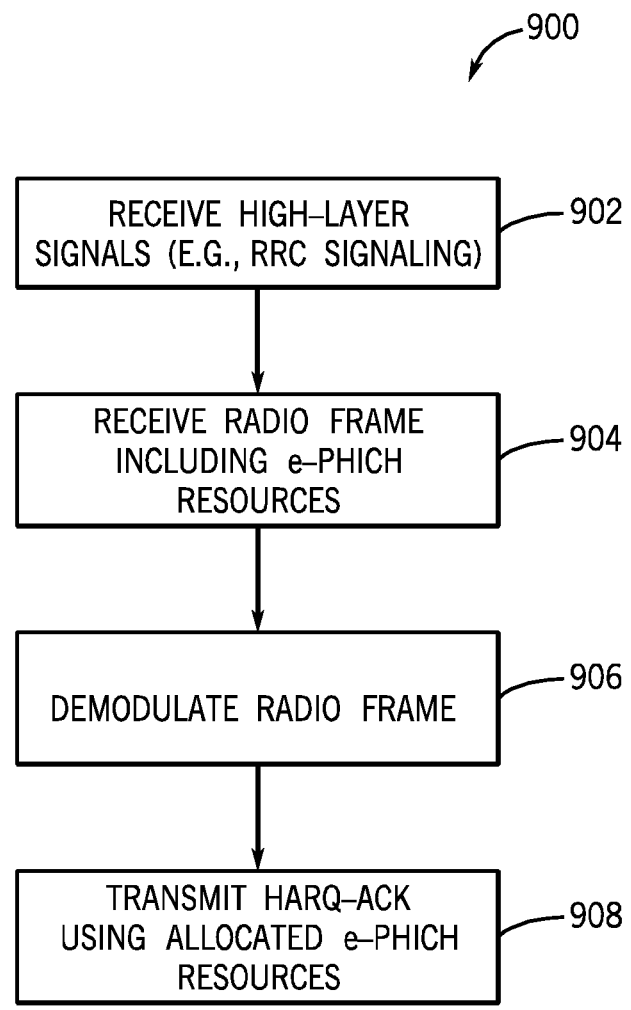
FIG. 9 illustrates an example flow diagram showing operations and functionalities performed by an UE in connection with e-PHICH resources according to some embodiments.

FIG. 9 illustrates an example flow diagram 900 showing operations and functionalities performed by an UE in connection with e-PHICH resources according to some embodiments. At a block 902, a transceiver included in the UE receives high-layer signaling transmitted from the eNodeB at the block 602. As discussed above in connection with FIG. 6, the high-layer signal includes information about, but is not limited to, the existence of e-PHICH resources, the puncturing/applicability of e-PHICH resources co-located in a given RB layer with e-PDCCH resources to other layers of the same RB, assignment of UE-RS CDM group assignment, and the e-PHICH REG aggregation level. The high-layer signal thus informs the UE of the specifics regarding the e-PHICH resources applicable to that UE.

Next at a block 904, the UE receives a radio frame including e-PHICH resources as specified by the high-layer signaling. A processor or processing circuitry included in the UE, at a block 906, then demodulates the radio frame, and in particular, the e-PHICH resources contained therein. The demodulation is performed using the same or different UE-RS CDM group as assigned by the eNodeB in the high-layer signaling. Additional details are provided above in connection with FIG. 7C.

With the UE-specific e-PHICH resources decoded, the UE configures and transmits HARQ-ACK information using the allocated e-PHICH resources at a block 908.

The term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract of the Disclosure is provided to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method to facilitate provision of acknowledgement signals for use by user equipments (UEs) operating in a wireless communications network, the method comprising:
    transmitting, by an evolved node B (eNodeB), radio resource control (RRC) signals indicating inclusion of an enhanced physical hybrid automatic repeat request (ARQ) indicator channel (e-PHICH) in a radio frame; and
    configuring, by the eNodeB, the radio frame including the e-PHICH, wherein at least one subframe of the radio frame includes a first layer of a resource block (RB) associated with a first UE and a second layer of the RB associated with a second UE, and wherein the first layer of the RB includes a physical downlink control channel (PDCCH) control region in a Slot 0 of the subframe and a first enhanced PDCCH (e-PDCCH) allocation in the Slot 0 and in a Slot 1 of the subframe, and wherein the e-PHICH allocation is included in at least the Slot 1 of the subframe of the first layer of the RB; and wherein a second layer of the RB includes a second e-PDCCH allocation in a second portion of the Slot 0 and in the Slot 1 of the subframe;
    wherein the RRC signals assign a same user equipment-reference signal (UE-RS) code division multiplexing (CDM) group to decode both the e-PHICH allocation and the first e-PDCCH allocation; and
    wherein a first resource element (RE) set for the e-PHICH allocation in the first layer of the RB is orthogonal with a first RE set for the first e-PDCCH allocation provided in the first layer of the RB and a second RE set for the second e-PDCCH allocation provided in the second layer of the RB.

2. The method of claim 1, wherein the second layer of the RB includes a PDCCH control region in a first portion of the Slot 0 of the subframe.

3. The method of claim 2, wherein a first resource element (RE) set for the e-PHICH allocation in the first layer of the RB is orthogonal with a first RE set for the first e-PDCCH allocation provided in the first layer of the RB and not a second RE set for the second e-PDCCH allocation provided in the second layer of the RB.

4. The method of claim 2, wherein the RRC signals include information about applicability of the e-PHICH allocation included in the first layer of the RB to the second layer of the RB for the second UE.

5. The method of claim 1, wherein the eNodeB, the first UE, and the second UE operate within a 3rd Generation Partnership Project (3GPP) long term evolution (LTE) network.

6. first user equipment (UE) operating in a wireless communications network, comprising:
    a transceiver to receive a resource control (RRC) signal including information about an enhanced physical hybrid automatic repeat request (ARQ) indicator channel (e-PHICH) included in a radio frame; and a processor in communication with the transceiver, the processor to demodulate the e-PHICH in accordance with the RRC signal, wherein at least one subframe of the radio frame includes a first layer of a resource block (RB) specific for the first UE and a second layer of the RB specific for a second UE, the first layer of the RB including a physical downlink control channel (PDCCH) control region in a first portion of a Slot 0 of the subframe, a first enhanced PDCCH (e-PDCCH) allocation in a second portion of the Slot 0 and in a Slot 1 of the subframe, and the e-PHICH in at least the Slot 1 of the subframe;
    wherein the processor demodulates both the e-PHICH and e-PDCCH allocations using a same user equipment reference signal (UE-RS) code division multiplexing (CDM) set; and
    wherein a first resource element (RE) set for the e-PHICH in the first layer of the RB is orthogonal with a first RE set for the first e-PDCCH provided in the first layer of the RB and a second RE set for a second e-PDCCH provided in the second layer of the RB.

7. The first UE of claim 6, wherein the RRC signal comprises a UE-specific dedicated RRC signal.

8. The first UE of claim 6, wherein a first resource element (RE) set for the e-PHICH in the first layer of the RB is orthogonal with a first RE set for the first e-PDCCH provided in the first layer of the RB and not a second RE set for the second e-PDCCH provided in the second layer of the RB.

9. The first UE of claim 6, wherein the RRC signal specifies applicability of the e-PHICH included in the first layer of the RB to the second layer of the RB for the second UE.

10. The first UE of claim 6, wherein a resource element group (REG) aggregation level of the e-PHICH is dynamically defined in a downlink control information (DCI) message included in an e-PDCCH channel of the radio frame, the DCI message comprising a latest DCI message used for initial transmission or re-transmission of a corresponding uplink data transmission associated with the e-PHICH.

11. The first UE of claim 10, wherein the RRC signal identifies a pre-defined set of candidate REG aggregation levels, the DCI message dynamically defining a REG aggregation level from among the pre-defined set of the candidate REG aggregation levels.

12. The first UE of claim 10, wherein a resource element group (REG) aggregation level of the e-PHICH is semi-statically configured by an evolved node B (eNodeB) associated with the first UE.

13. The first UE of claim 10, wherein the REG aggregation level corresponds to a control channel element (CCE) aggregation level associated with the e-PDCCH channel, and wherein the CCE aggregation level is 1, 2, 4, or 8 aggregation levels.

14. The first UE of claim 6, wherein the e-PHICH comprises a plurality of resource element groups (REGs), the plurality of REGs comprising 2, 3, 4, or 6 REGs and each of the plurality of REGs configured in an e-PHICH REG pattern.

15. The first UE of claim 14, wherein a first e-PHICH REG pattern corresponding to a first REG is a subset of a second e-PHICH REG pattern corresponding to a second REG, the first REG being smaller than the second REG.

16. The first UE of claim 14, wherein a first e-PHICH REG pattern corresponding to a first REG and a second e-PHICH REG pattern corresponding to a second REG are distributed between the Slot 0 and Slot 1 of the subframe, the first and second REGs being different from each other.

17. The first UE of claim 14, wherein REs comprising the e-PHICH REG pattern are allocated between proximate reference symbols (RSs).

18. The first UE of claim 14, wherein REs comprising the e-PHICH REG pattern are evenly allocated into different Orthogonal Frequency Division Multiplex (OFDM) symbols.

19. The first UE of claim 6, wherein the first UE operates within a 3rd Generation Partnership Project (3GPP) long term evolution (LTE) network.

20. An evolved node B (eNodeB), comprising:
a transceiver to transmit a radio resource control (RRC) signal including information about an enhanced physical hybrid automatic repeat request (ARQ) indicator channel (e-PHICH) in a radio frame; and a processing circuitry in communication with the transceiver, the processing circuitry to configure the radio frame, wherein at least one subframe of the radio frame includes a first layer of a resource block (RB) associated with a first user equipment (UE) and a second layer of the RB specific for a second UE, the first layer of the RB including a physical downlink control channel (PDCCH) control region in a first portion of a Slot 0 of the subframe, the first layer of the RB further including in a second portion of the Slot 0 and in a Slot 1 of the subframe an enhanced physical downlink control channel (e-PDCCH) and the e-PDCCH, and wherein a second layer of the RB includes a second e-PDCCH allocation in a second portion of the Slot 0 and in the Slot 1 of the subframe;
wherein the RRC signals assign a same user equipment-reference signal (UE-RS) code division multiplexing (CDM) group to decode both the e-PHICH channel and the e-PDCCH channel; and
wherein a first resource element (RE) set for the e-PHICH in the first layer of the RB is orthogonal with a first RE set for the first e-PDCCH provided in the first layer of the RB and a second RE set for the second e-PDCCH provided in the second layer of the RB.

* * * * *

UNITED STATES PATENT AND TRADEMARK OFFICE
CERTIFICATE OF CORRECTION

| | | |
|---|---|---|
| PATENT NO. | : 9,060,313 B2 | Page 1 of 1 |
| APPLICATION NO. | : 13/630008 | |
| DATED | : June 16, 2015 | |
| INVENTOR(S) | : He et al. | |

It is certified that error appears in the above-identified patent and that said Letters Patent is hereby corrected as shown below:

In the Claims

In column 14, line 12, in Claim 6, before "first", insert --A--, therefor

In column 14, line 30-31, in Claim 6, delete "equipment reference" and insert --equipment-reference--, therefor In column 16, line 14, in Claim 20, delete "e-PDCCH" and insert --e-PHICH--, therefor Signed and Sealed this
First Day of December, 2015

Michelle K. Lee
*Director of the United States Patent and Trademark Office*